United States Patent [19]

(12) United States Patent
Roy

(10) Patent No.: US 7,957,377 B1
(45) Date of Patent: Jun. 7, 2011

(54) REDUCING AND LOAD BALANCING LINK-STATE REQUESTS IN OSPF

(75) Inventor: Abhay Roy, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1058 days.

(21) Appl. No.: 10/903,742

(22) Filed: Jul. 30, 2004

(51) Int. Cl.
*H04L 12/28* (2006.01)
*H04L 12/26* (2006.01)
*G06F 15/173* (2006.01)

(52) U.S. Cl. ........ 370/392; 370/248; 370/254; 370/351; 709/224

(58) Field of Classification Search .................. 709/224; 370/248, 254, 351
See application file for complete search history.

(56) References Cited

U.S. PATENT DOCUMENTS

| | | | |
|---|---|---|---|
| 6,885,634 B1 * | 4/2005 | Choudhury et al. | 370/217 |
| 6,973,023 B1 * | 12/2005 | Saleh et al. | 370/217 |
| 7,363,387 B1 * | 4/2008 | Chandra et al. | 709/242 |
| 2001/0034793 A1 * | 10/2001 | Madruga et al. | 709/238 |
| 2003/0056138 A1 * | 3/2003 | Ren | 714/4 |
| 2004/0073683 A1 * | 4/2004 | Beck et al. | 709/227 |
| 2004/0246948 A1 * | 12/2004 | Lee et al. | 370/352 |
| 2005/0135357 A1 * | 6/2005 | Riegel et al. | 370/389 |
| 2005/0185632 A1 * | 8/2005 | Draves et al. | 370/351 |

* cited by examiner

*Primary Examiner* — Pankaj Kumar
*Assistant Examiner* — Lonnie Sweet
(74) *Attorney, Agent, or Firm* — Cesari and McKenna, LLP

(57) ABSTRACT

A method of administering a plurality of routers in a computer network, comprising initializing a router in the plurality; receiving initial database description packets from at least first and second neighboring routers; processing the data description packet received from the first neighboring router; generating a request for link state advertisements from the first neighboring router; processing the database description packet received from the second neighboring router; if requesting link state advertisements from the second neighboring router that were not requested from the first neighboring router.

24 Claims, 2 Drawing Sheets

REDUCING AND LOAD BALANCING LINK-STATE REQUESTS IN OSPF

FIELD

The present invention relates broadly to computer networks employing routers that communicate link-state requests to each other. Specifically, the present invention relates to elimination of unnecessary traffic in the form of link-state requests between routers.

BACKGROUND

Open shortest path first (OSPF) is an Internal gateway protocol that was designed to be used internally in a single, autonomous system. OSPF uses link state or shortest path first-based technology (as compared to the distance-vector or Bellman-Ford technology found in routing protocols such as routing information protocol (RIP). Individual link state advertisements (LSAs) describe pieces of the OSPF routing domain (autonomous system). These LSAs are flooded throughout the routing domain, forming the link state database. Each router has an identical link state database; synchronization of link state databases is maintained via a reliable flooding algorithm. From this link state database, each router builds a routing table by calculating a shortest-path tree, with the root of the tree being the calculating router itself. This calculation is commonly referred to as the Dijkstra procedure.

LSAs are small. Each advertisement describes a small piece of the OSPF routing domain, such as the neighborhood of a single router, the neighborhood of a single transit network, a single inter-area route or a single external route.

This type of routing protocol requires each router to maintain at least a partial map of the network. When a network link changes state (up to down, or vice versa), an LSA is flooded throughout the network. All the routers note the change, and recompute their routes accordingly. This method is more reliable, easier to debug and less bandwidth-intensive than distance-vector methods. It is also more complex and more computationally- and memory-intensive. OSPF and OSI's IS-IS are link state routing protocols.

Adjacency, as referred to herein, is a relationship formed between selected neighboring OSPF routers for the purpose of exchanging routing information. When the link state databases of two neighboring routers are synchronized, the routers are said to be adjacent. Not every pair of neighboring routers becomes adjacent. The fact that routers are neighbors is not sufficient to guarantee an exchange of link state updates; they must form adjacencies to exchange link state updates. Adjacency is an advanced form of neighborship formed by routers that are willing to exchange routing information after negotiating parameters of such an exchange. Routers reach a FULL state of adjacency when they have synchronized views on a link state database.

Interface type plays a major role in how the adjacencies are formed. For example, neighbors on point-to-point links always try to become adjacent, while routers attached to broadcast media such as Ethernet may choose to become adjacent only with a subset of neighboring routers on the interface.

Once a router decides to form an adjacency with a neighbor, it starts by exchanging a full copy of its link state database. The neighbor, in turn, exchanges a full copy of its link state database with the router. After passing through several neighbor states, the routers become fully adjacent.

As stated above, OSPF is a link state protocol. When an OSPF-compliant router starts to speak with another router, it brings up an adjacency via a database exchange process. The database exchange is an attempt to synchronize the link state database of the two routers. Any missing information is requested from the neighbor. This does not scale, if a routers starts to speak with many other routers. It could potentially request the same information from all the adjacent routers. Each such request results in an LSA update, which must be reliably acknowledged. This results in unnecessary control packet transmissions.

When a router receives from a neighbor a database description (DBD) packet containing LSA descriptions that are not present in its local link state database, the router sends out a link state request (LSREQ) directed towards the neighbor. In the case of multiple adjacencies coming up at the same time, the link state database synchronization process could request the same LSA from multiple peers.

The neighbor replies to these requests in one or more link state update (LSUPD) packets. Each such duplicate request results in a duplicate update from the peer. Each such LSUPD further results in the sending of an acknowledgement (ACK).

The protocol described above becomes expensive in wireless environments, such as mobile, ad hoc networks where not only are unnecessary OSPF packets sent, but these packets can be retransmitted many times due to packet loss. This results in higher control traffic overhead and poor routing convergence. Thus, there is a heartfelt need for reduction and load balancing of link state requests in an OSPF-compliant system of network routers.

SUMMARY

The present invention reduces the link state requests, thus reducing duplicate updates and ACKs sent in such circumstances. The present invention suppresses LSREQs for LSAs that have already been requested from at least one neighboring router. This moves the LSREQ scope from a neighbor to the LSAs' flooding scope. In an embodiment, the present invention also provides failsafe mechanisms that try to send a LSREQ to other possible neighbors in case the current neighbor does not respond.

In one aspect, the present invention provides a method of administering a plurality of routers in a computer network, comprising initializing a router in the plurality; receiving initial database description packets from at least first and second neighboring routers; processing the data description packet received from the first neighboring router; generating a request for link state advertisements from the first neighboring router; processing the database description packet received from the second neighboring router; if requesting link state advertisements from the second neighboring router that were not requested from the first neighboring router.

DETAILED DESCRIPTION

Figure 1:
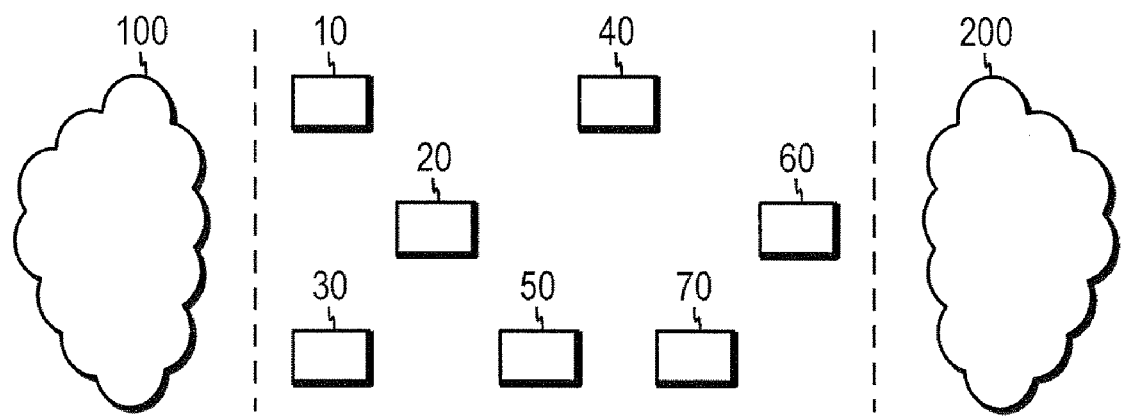
FIG. 1 illustrates a network of routers in accordance with the present invention.

Directing attention to FIG. 1, there is shown an exemplary network of routers in accordance with the present invention.

Routers 10-70 function to pass traffic in the form of packetized data between points 100, 200. Points 100, 200 can be individual, end user computer systems, local area networks, wider area networks, and may even be separate computer networks containing additional routers, but in each case data packets are sent through at least some of the routers 10-70 between points 100, 200. While FIG. 1 illustrates a network having a specific number of routers 10-70, it is to be understood that various configurations of routers can be implemented in accordance with the present invention. Such variations include the number of routers included, as well as the communication medium employed between the routers. Routers 10-70 can communicate with each other over wireless media as well as wired media, as can points 100, 200.

Figure 2:
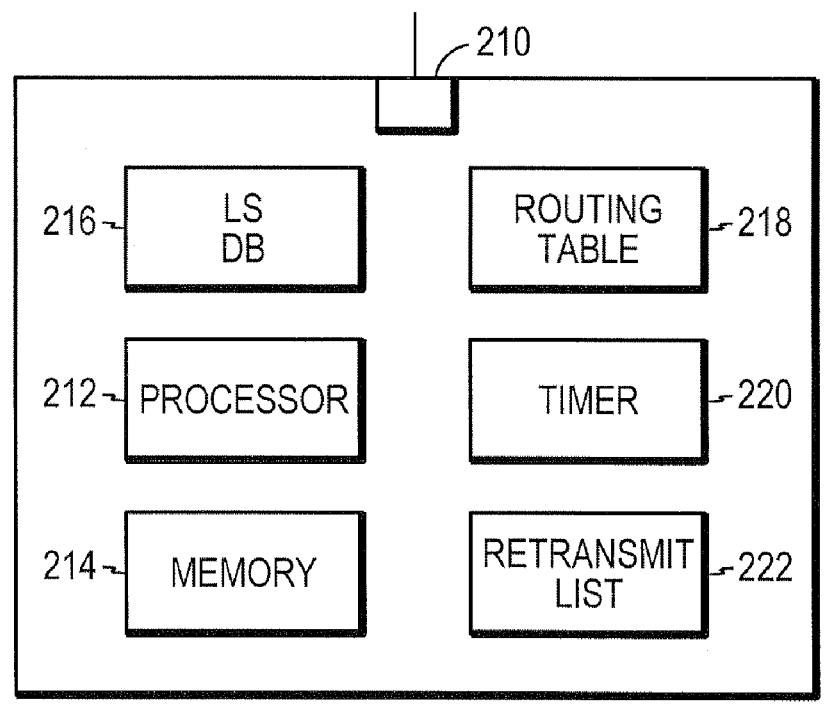
FIG. 2 illustrates in block diagram form the major components of a router in accordance with the present invention.

FIG. 2 illustrates an exemplary embodiment of routers 10-70. Router 200 includes communication connection 210, processor 212, memory 214, link state database 216, routing table 218, timer 220, and retransmit list 222. Other components, commonly found in routers known to those skilled in the art, are included in router 200, but are not illustrated.

Figure 3:
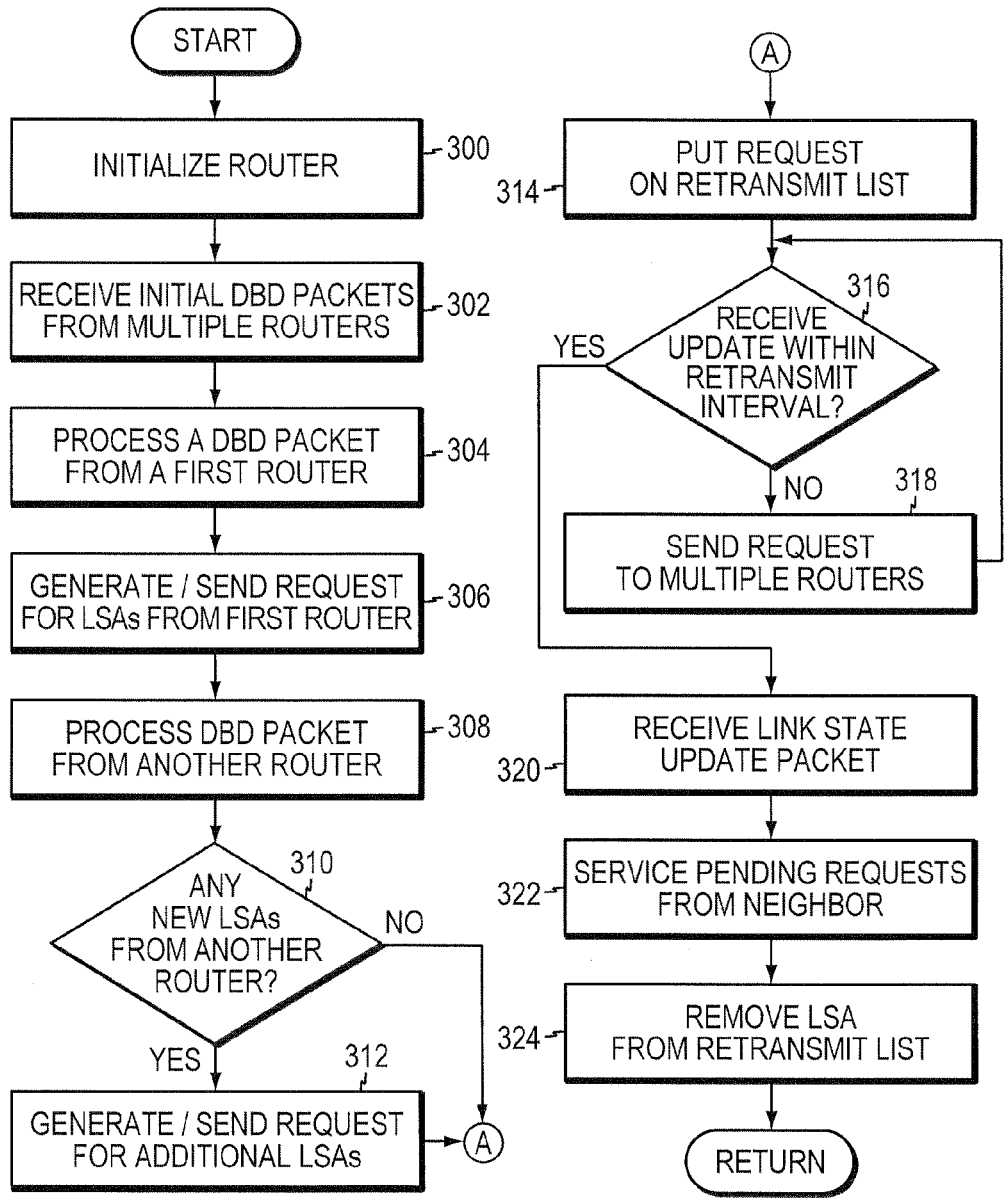
FIG. 3 illustrates in flow chart form a sequence of acts performed in accordance in an embodiment of the present invention.

Operation of the present invention is described with reference to the sequence of acts illustrated in FIG. 3. In an embodiment, when router 10 is coming up (act 300), it needs to bring up neighborship with two routers 20 and 30. It's assumed that router 20 and router 30 are already synchronized and have identical databases. In this case, router 10 receives an initial DBD packet from both router 20 and router 30 (act 302). In the case where the DBD packet received from router 20 gets processed first (act 304), router 10 will generate one LSREQ packet (act 306), requesting all of the LSAs it does not have from router 20. Processing a DBD packet allows router 10 to inspect all headers in the list of headers of LSAs included in the DBD packet.

When router 10 processes the initial DBD packet received from router 30 (act 308), router 10 determines whether the initial DBD packet received from router 30 contains headers for LSAs that were not included in the initial DBD packet from router 20 (decision act 310). Router 10 only generates a request for LSAs that it has not already requested from router 20 (act 312). In cases where the DBD packet is formed in a predictable fashion, both initial DBD packets from router 20 and router 30 are almost identical. In this case, router 10 doesn't generate a request after processing this initial DBD packet from router 30. Even though router 10 doesn't request anything from router 30, it still behaves as if it requested the LSAs from router 30 by putting this LSA on its LSREQ retransmit list (act 314).

If router 20 does not respond within a retransmit interval (decision act 316), a request is now sent to both router 20 and router 30 (act 318). While act 318 is illustrated as looping back to decision act 316, in an alternative embodiment, sending the request to multiple routers is performed only once. An update received from either router 20 or router 30 satisfies the LSREQ retransmit entry for both router 20 and router 30. When the LSUPD arrives (either from router 20 or another router) (act 320), router 10 services any pending request (act 322) for the same LSA from all the neighbors (router 20 and router 30 in this example). The LSA is then removed from the LSA retransmit list (act 324).

The present invention is particularly useful in cases where a router has to bring up adjacency with tens or hundreds of peers at the same time such as due to mobility. But in case of lossy environments, it's possible that the first request doesn't generate a LSUPD response, thus triggering retransmits from all of the pending neighbors.

An embodiment of the present invention implements a round robin scheme that tries sending LSREQ to all eligible neighbors before retransmitting an LSREQ to the same neighbor. This is simply done by using a shorter (perhaps one half of the interval period) retransmit interval timer for the neighbors to which router 10 has pretended to have sent LSREQ. Every LSREQ sent results in an addition of one half of the retransmit interval to currently waiting timers.

To further explain this feature, assume there is a need to request a certain LSA from neighboring routers 20, 30 and 40. Also assume the worst case, where neighbors are not able to reply with an LSUPD packet. In accordance with the present invention, the request is first sent to router 20. After one half of the retransmit interval passes, the timer for router 30 expires, and a request is sent to router 30. The retransmit timers for router 40 and router 20 are pushed by another retransmit interval. After time equal to one half of the retransmit interval passes, the timer for router 40 expires.

While a method and apparatus for reducing and load balancing link state requests in a network of routers have been illustrated and described in detail, it is to be understood that numerous modifications can be made to embodiments of the present invention without departing from the spirit thereof.

What is claimed is:

1. In a computer network having a plurality of routers that communicate link state information to each other, a method of reducing link state request traffic across the network, the method comprising:

receiving at a router a first database description packet from a first neighboring router communicating with the router, the first database description packet describing link state advertisements available from the first neighboring router;

examining the packet to determine what, if any, link state advertisements to request from the first neighboring router;

requesting link state advertisements from the first neighboring router;

receiving at the router a second database description packet from a second neighboring router communicating with the router, the second database description packet describing link state advertisements available from the second neighboring router; and determining if the second neighboring router has additional link state advertisements available that are not available from the first neighboring router and, if the second is neighboring router does have additional link state advertisements available that are not available from the first neighboring router, then requesting by the router only the additional link state advertisements from the second neighboring router, and suppressing generating requests at the router for link state advertisements from the second neighboring router that have already been requested by the router from the first neighboring router but that have not yet been received from the first neighboring router.

2. The method of claim 1, further comprising placing a request for the link state advertisements that have already been requested but that have not yet been received on a retransmit list, and, if an update containing the requested link state advertisements is not received within a period of time, then requesting the requested link state advertisements from a plurality of routers.

3. The method of claim 2, wherein the requesting from a plurality routers is repeated if an update containing the requested link state advertisements is not received within a period of time.

4. The method of claim 2, wherein the requesting the requested link state advertisements from the plurality of routers is performed serially, in a round robin fashion, until the requested link state advertisements are received by the router.

5. A non-transitory computer-readable medium containing instructions which, when executed by a router, reduce link state request traffic across a computer network having a plurality of routers that communicate link state information to each other, by:
   receiving at the router a first database description packet from a first neighboring router communicating with the router, the first database description packet describing link state advertisements available from the first neighboring router;
   examining the packet to determine what, if any, link state advertisements to request from the first neighboring router;
   requesting link state advertisements from the first neighboring router;
   receiving at the router a second database description packet from a second neighboring router communicating with the router, the second database description packet describing link state advertisements available from the second neighboring router; and
   is determining if the second neighboring router has additional link state advertisements available that are not available from the first neighboring router and, if the second neighboring router does have additional link state advertisements available that are not available from the first neighboring router, then requesting by the router only the additional link state advertisements from the second neighboring router, and suppressing generating requests at the router for link state advertisements from the second neighboring router that have already been requested by the router from the first neighboring router but that have not yet been received from the first neighboring router.

6. The non-transitory computer-readable medium of claim 5, further comprising instructions for placing a request for the link state advertisements that have already been requested but that have not yet been received on a retransmit list, and, if an update containing the requested link state advertisements is not received within a period of time, then requesting the requested link state advertisements from a plurality of routers.

7. The non-transitory computer-readable medium of claim 6, wherein the requesting from a plurality of routers is repeated if an update containing the requested link state advertisements is not received within a period of time.

8. The non-transitory computer-readable medium of claim 6, wherein requesting the requested link state advertisements from the plurality of routers is performed serially, in a round robin fashion, until the requested link state advertisements are received by the router.

9. A router for use in a computer network having a plurality of routers that communicate link state information to each other, the router comprising:
   means for receiving a first database description packet from a first neighboring router, the first database description packet describing link state advertisements available from the first neighboring router;
   means for examining the packet to determine what, if any, link state advertisements to request from the first neighboring router;
   means for requesting link state advertisements from the first neighboring router;
   means for receiving a second database description packet from a second neighboring router, the second database description packet describing link state advertisements available from the second neighboring router; and
   means for determining if the second neighboring router has additional link state advertisements available that are not available from the first neighboring router and, if the second neighboring router does have additional link state advertisements available that are not available from the first neighboring router, then requesting by means at the router only the additional link state advertisements from the second neighboring router, and suppressing generating requests for link state advertisements from the second neighboring router that have already been requested from the first neighboring router but that have not yet been received from the first neighboring router.

10. The router of claim 9, further comprising means for placing a request for the link state advertisements that have already been requested but that have not yet been received on a retransmit list, and, if an update containing the requested link state advertisements is not received within a period of time, then requesting the requested link state advertisements from a plurality of routers.

11. The router of claim 10, further comprising means for repeating the requesting from a plurality of routers if an update containing the requested link state advertisements is not received within a period of time.

12. The router of claim 10, further comprising means for requesting the requested link state advertisements from the plurality of routers serially, in a round robin fashion, until the requested link state advertisements are received by the router.

13. The method of claim 1, wherein requesting link state advertisements from the first neighboring router comprises sending a first link state request (LSREQ) packet, and requesting only the additional link state advertisements from the second neighboring router comprises sending a second LSREQ packet.

14. The method of claim 13, further comprising receiving one or more link state update (LSUPD) packets.

15. The method of claim 1, further comprising determining if the sec- and neighboring router does not have any additional link state advertisements available that are not available from the first neighboring router, and, if so, not requesting any link state advertisements from the second neighboring router.

16. The method of claim 15, further comprising placing a request for link state advertisements from the second neighboring router on a retransmit list even if the router did not already request link state advertisements from the second neighboring router.

17. The method of claim 1, further comprising placing a request on a retransmit list, and, if an update containing the link state advertisements that have already been requested from the first neighboring router is not received from the first neighboring router within a period of time, then requesting from the second neighboring router the requested link state advertisements.

18. The non-transitory computer-readable medium of claim 5, further comprising instructions for determining if the second neighboring router does not have any additional link state advertisements available that are not available from the first neighboring router, and, if so, not requesting any link state advertisements from the second neighboring router.

19. The non-transitory computer-readable medium of claim 5, further comprising instructions for placing a request for link state advertisements from the second neighboring router on a retransmit list even if the router did not already request link state advertisements from the second neighboring router.

20. The non-transitory computer-readable medium of claim 5, further comprising instructions for placing a request on a retransmit list, and, if an update containing the link state advertisements that have already been requested from the first neighboring router is not received from the first neighboring router within a period of time, then requesting from the second neighboring router the requested link state advertisements.

21. A method comprising:
   receiving at a router a first database description packet from a first neighboring router, the first database description packet describing link state advertisements available from the first neighboring router;
   examining the first database description packet to determine one or more link state advertisements to request from the first neighboring router;
   requesting the one or more link state advertisements from the first neighboring router;
   receiving at the router a second database description packet from a second neighboring router, the second database description packet describing link state advertisements available from the second neighboring router; and
   in response to receiving the second database description packet from the second neighboring router, requesting, by the router, any link state advertisements from the second neighboring router that have not been requested from the first neighboring router, and not requesting link state advertisements from the second neighboring router that have already been requested from the first neighboring router but that have not yet been received from the first neighboring router.

22. The method of claim 21, further comprising determining if the second neighboring router does not have any link state advertisements available that are not available from the first neighboring router, and, if so, not requesting any link state advertisements from the second neighboring router.

23. The method of claim 22, further comprising placing a request for link state advertisements from the second neighboring router on a retransmit list even if the router did not request link state advertisements from the second neighboring router.

24. The method of claim 22, further comprising placing a request on a retransmit list, and, if an update containing the link state advertisements that have already been requested from the first neighboring router is not received from the first neighboring router within a period of time, then requesting from the second neighboring router the requested link state advertisements.

* * * * *

UNITED STATES PATENT AND TRADEMARK OFFICE
CERTIFICATE OF CORRECTION

PATENT NO. : 7,957,377 B1  
APPLICATION NO. : 10/903742  
DATED : June 7, 2011  
INVENTOR(S) : Abhay Roy Page 1 of 1

It is certified that error appears in the above-identified patent and that said Letters Patent is hereby corrected as shown below:

Correct as follows:

Col. 1, line 20: "Individual link̲-state"

Col. 4, line 45: "second ~~is~~ neighboring router does have additional link"

Col. 5, line 24: "~~is~~ determining if the second neighboring router has additional"

Col. 6, line 40: "if the ~~sec--and~~ second̲ neighboring router does not have any additional"

Signed and Sealed this  
Tenth Day of January, 2012

David J. Kappos  
*Director of the United States Patent and Trademark Office*